Jan. 20, 1959 E. C. SWANSON 2,869,407
PORTABLE METAL WORKING TOOL
Filed Oct. 15, 1954 2 Sheets-Sheet 1
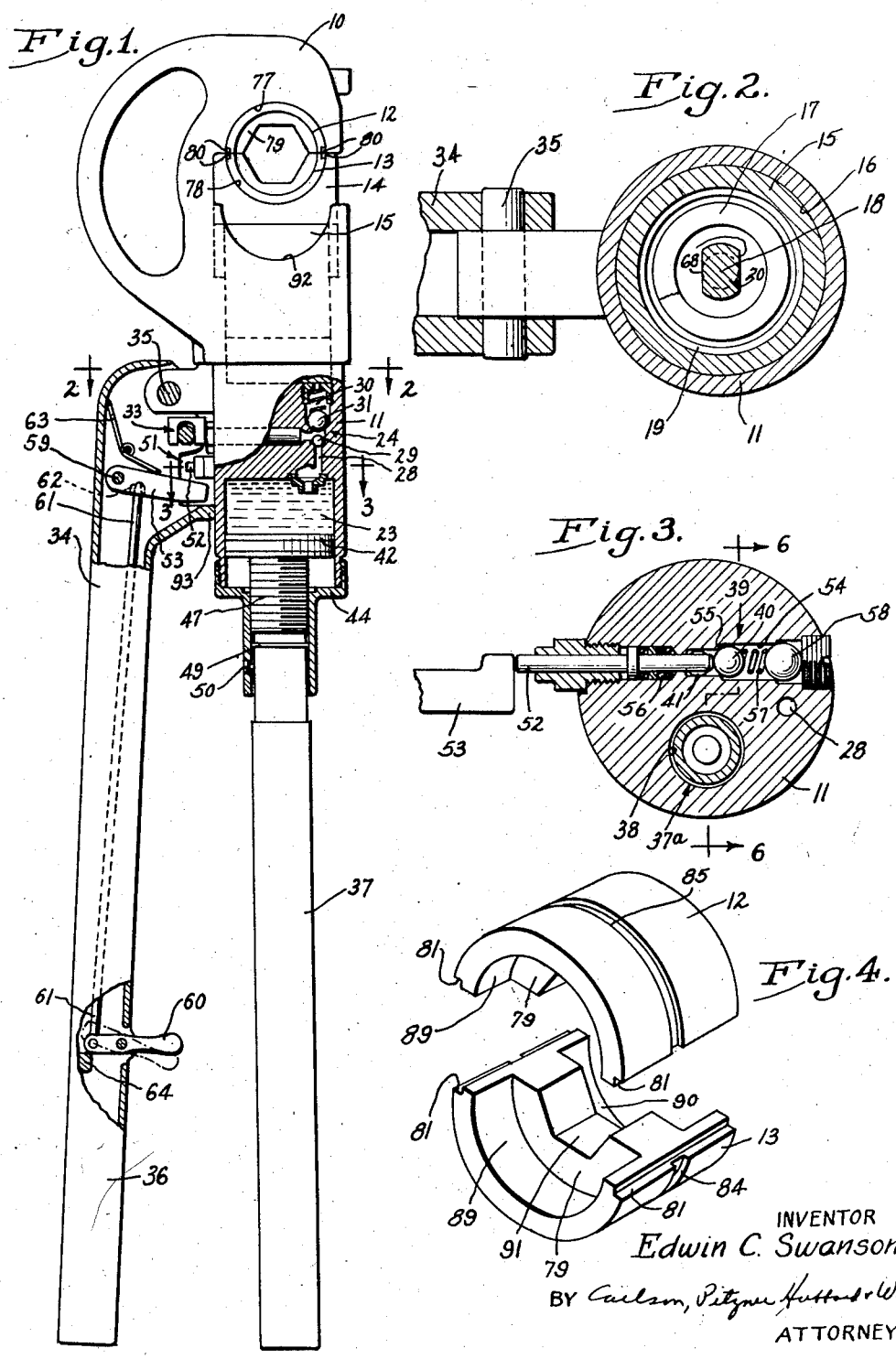
INVENTOR
Edwin C. Swanson
BY
ATTORNEYS

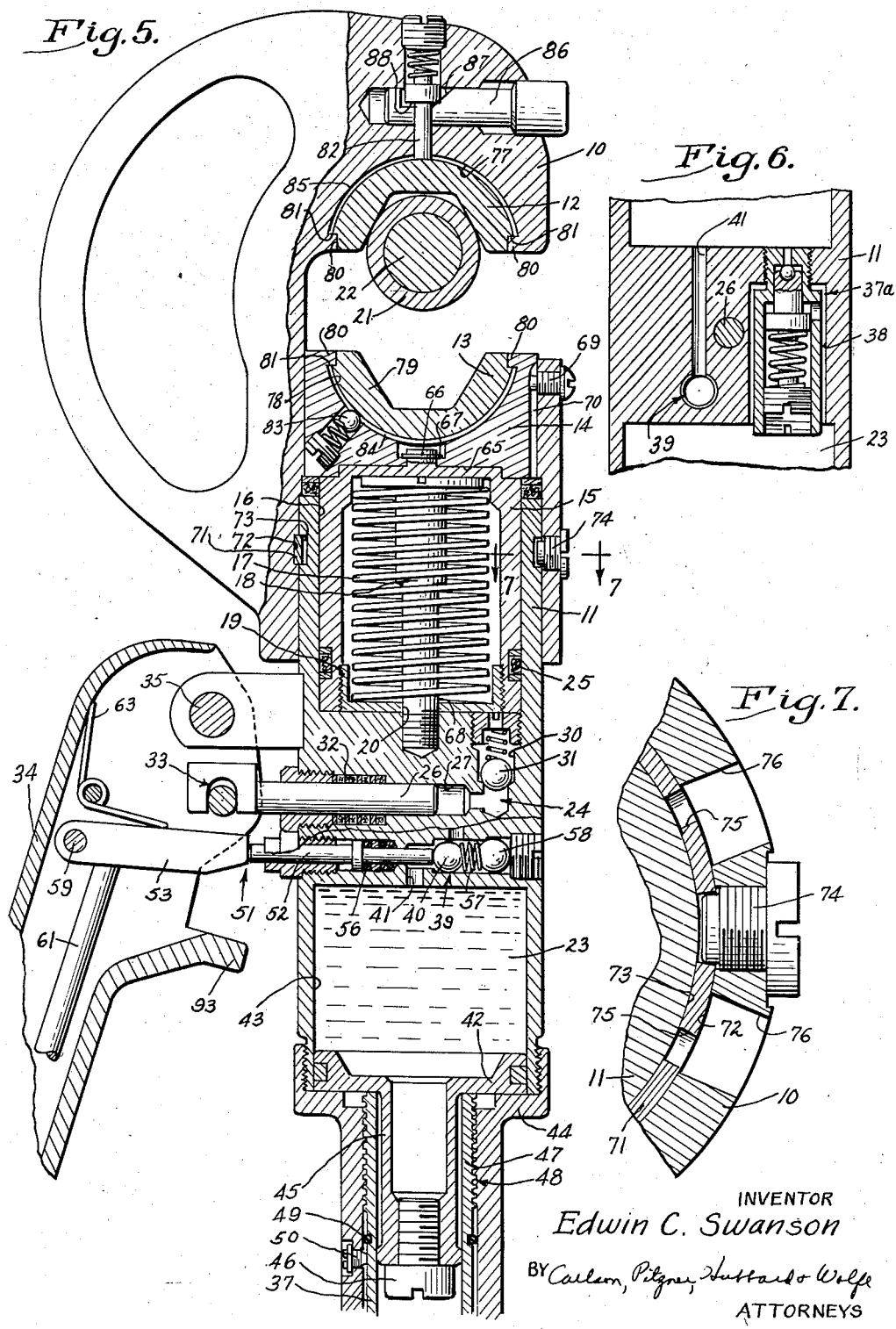

United States Patent Office 2,869,407
Patented Jan. 20, 1959

2,869,407

PORTABLE METAL WORKING TOOL

Edwin C. Swanson, Rockford, Ill., assignor to Greenlee Bros. & Co., Rockford, Ill., a corporation of Illinois Application October 15, 1954, Serial No. 462,443

5 Claims. (Cl. 81—15)

This invention relates to portable presses of the type used in splicing electrical cables and having two dies one of which is fixed in a head carried by a body and the other of which is carried by a ram reciprocable in a cylinder in the body and shiftable toward the fixed die to apply clamping pressure against a splicing sleeve disposed between the dies and encircling the ends of cables to be joined together. More particularly, the invention relates to a hydraulic press in which the dies and the head swivel together relative to the body and which includes a handle in the form of a lever fulcrumed on the body and swingable toward and away from the latter to pump fluid into the cylinder to advance the movable die toward the fixed die.

One object of the invention is to swivel the head on the body by a novel connection which permits free rotation of the head relative to the body while still retaining the two in axially fixed relation so that a uniform number of pumping strokes of the handle is effective to apply the desired clamping pressure to the ram in all angular positions of the head and dies relative to the body.

The invention also resides in the novel construction of the dies and the holders therefor to render the dies interchangeable in service use and to simplify the manufacture of the dies.

Other objects and advantages of the invention will become apparent from the following detailed description taken in connection with the accompanying drawings, in which—

Figure 1 is a side elevational view of a hydraulic press embodying the novel features of the present invention, some of the parts being broken away and shown in section.

Figs. 2 and 3 are fragmentary sectional views taken respectively along the line 2—2 and 3—3 of Fig. 1.

Fig. 4 is a perspective view of the dies.

Fig. 5 is a fragmentary enlarged diametrical sectional view similar to Fig. 1 showing the parts in different positions.

Fig. 6 is a fragmentary sectional view taken along the line 6—6 of Fig. 3.

Fig. 7 is a fragmentary sectional view taken along the line 7—7 of Fig. 5.

In the drawings, the invention is shown for purposes of illustration embodied in a hydraulic press which is particularly suited for use in splicing electrical cables and which comprises generally a cylindrical body 11 and a C-shaped head 10 mounted thereon and carrying a fixed die 12 spaced from the body. A cooperating die 13 is mounted in a die holder 14 carried by a hollow ram or piston 15 which is reciprocable toward and away from the fixed die in a cylinder 16 in the body and is normally urged into a retracted position shown in Fig. 5 by a spring 17. The latter encircles a bolt 18 threaded into the body and acts between the head of the bolt and a cup 19 threaded into the ram and having a hole 20 receiving the shank of the bolt. In service use, the movable die 13 is advanced toward the fixed die to apply pressure to opposite sides of a splicing sleeve 21 disposed between the dies and to clamp the sleeve to a cable 22 telescoped within the sleeve.

To advance the ram 15 and shift the die 13 thereon axially toward the fixed die 12, fluid such as oil is forced under pressure into the cylinder 16 from a reservoir 23 in the body 11 by a pump 24, a seal ring 25 seated in an annular groove on the exterior of the ram preventing the escape of pressure fluid between the ram and the cylinder wall. The pump includes a piston 26 reciprocable in a bore 27 which extends transversely through the body and communicates with hte reservoir 23 through an inlet passage 28 (Figs. 1 and 3) and a check valve 29 and with the ram cylinder 16 through an outlet passage 30 (Figs. 1 and 5) and a check valve 31. At its outer end, the piston extends through a packing 32 to the exterior of the body and is pivotally and slidably connected at 33 to an elongated hollow lever 34 which is fulcrumed at 35 on the body adjacent one end of the lever and the connection 33 with the piston. The other end portion 36 of the lever and a tubular extension 37 of the body constitute handles which are grasped by the operator and swung toward and away from each other to advance and retract the piston 26, thereby actuating the pump.

Build-up of pressure in the ram cylinder 16 is limited to a predetermined value by an overload or pressure relief valve 37a (Figs. 3 and 6) which normally closes a passage 38 between the cylinder and the reservoir and, when it opens, produces a drop in the pressure of the ram cylinder fluid. To permit retraction of the ram 15 under the action of the return spring 17, pressure fluid is released from the ram cylinder 16 by opening a normally closed exhaust valve 39 having a movable element 40 and located in a passage 41 (Figs. 3, 5 and 6) extending between the cylinder and the reservoir.

One end wall of the reservoir 23 is defined by a follow-up piston 42 which is reciprocable in and is sealed around its periphery against a cylindrical wall 43 of the reservoir, a cap 44 threaded on the end of the body limiting outward movement of the piston. The reservoir is filled through a hollow axial extension 45 of the piston (Fig. 5) which is threaded to receive a plug 46 and telescopes into the inner end portion 47 of the body handle 37. The latter has a coarse thread engagement 48 with the cap 44 and its inner end abuts the outer side of the piston and constitutes an adjustable stop movable beyond the cap to advance the piston and force oil into the ram cylinder 16 to project the ram 15 outwardly at a rapid rate by turning the body extension into the body. Turning of the body handle 37 out of the cap 44 normally is limited by abutment of a snap ring 49 on the exterior of the handle with a stop screw 50 on the cap, the stop screw being retractible for removal of the handle during filling of the reservoir.

The swinging motion of the handles is utilized both to open the exhaust valve 39 and to actuate the pump 24 while still permitting independent actuation of the latter. This is accomplished by transmitting the motion of the lever 34 to the movable element 40 of the valve 39 through a connection 51 which normally is disengaged permitting actuation of the pump with the valve closed (Fig. 3) but which may be engaged selectively from a point on the lever handle 36 for shifting the valve element 40 to open position (see Fig. 5) as an incident to swinging the lever toward the body. Generally, the connection comprises a valve actuator 52 shiftable on the body 11 between valve open and valve closed positions and accessible from the exterior of the body and a member 53 carried by the lever and movable relative thereto between an inactive out-of-the-way position (see Fig. 1) in which the member moves freely past the actuator and an active position in which the member is alined with and engages the actuator as shown in Fig. 3 to shift the same to its valve open position when the lever is swung toward the body as shown in Fig. 5.

In the present instance, the movable valve element 40 is a ball shiftable in a bore 54 in the body 11 toward and away from an annular seat 55 facing along the passage 41 away from the reservoir. The actuator 52 is a pin extending through the body to the exterior thereof at one end and reciprocable in a packing 56 from its valve closed position far enough behind the seat 55 that the ball 40 engages the latter (Fig. 3) to its valve open position in which the inner end of the pin engages the ball and holds the same away from the seat (Fig. 5). A spring 57 acting between the valve ball and a second ball 58 sealing the outer end of the bore 54 yieldably urges the valve ball against the seat and, acting through the valve ball, urges the pin to its outer valve closed position.

The shiftable member 53 is a bar whose outer end is pivoted at 59 on the lever 34 for swinging of its inner end longitudinally of the lever between an active position of alinement with the valve actuator pin 52 (Figs. 3 and 5) and its inactive out-of-the-way position to one side of the pin so that the bar moves freely past the pin and remains out of engagement therewith as shown in Fig. 1. Selective engagement of the connection 51 from a point on the handle 36 is effected by shifting a trigger 60 in the form of a lever fulcrumed on the handle and acting through a rod 61 which is pivotally connected at one end to the trigger and extends therefrom along the interior of the handle toward the bar, the trigger projecting from the handle for actuation by the index finger of the hand of the operator grasping the lever handle 36. At its other end, the rod is received in a recess 62 on one side of the bar and abuts the latter. A spring 63 acting between the pump lever 36 and the other side of the bar urges the bar toward its inactive position and the trigger against a stop 64 on the lever.

The head 10 preferably telescopes on the body 11 and is swiveled thereon by a connection 71 to enable the operator to locate the handles 36 and 37 relative to his body in positions most convenient for actuation of the pump. To permit such swiveling of the movable die 13 while prolonging the service life of the ram 15 and its cylinder 16, the die holder 14 is formed separately from the ram but connecting the two for axial reciprocation together and rotation relative to each other. This enables the movable die and the holder to swivel with the head while the ram is fixed against rotation relative to the body thereby avoiding circumferential scores in the wall of the cylinder 16 and prolonging the service life of the ram and its seal 25. Herein, the die holder 14 is a cylindrical block having an annular recess 65 on its inner end receiving a complementary axial projection on the outer end of the ram 15, a boss 66 on the latter projecting axially through the die holder and having a snap ring 67 thereon retaining the holder on the ram for reciprocation therewith. The connection between the ram and the body 11 permitting axial movement but preventing rotation of the two relative to each other comprises the bolt 18 which is tightened into the body and the cup 19 which is turned tightly into the ram, the bolt shank being flattened on opposite sides as indicated at 68 (Figs. 2 and 5) and the cup hole 20 being of a corresponding shape to prevent rotation between the cup and the bolt. A connection providing similar relative movement between the die holder 14 and the body 11 comprises a retractible screw 69 (Fig. 5) threaded through the body from the exterior thereof and into an axially extending slot 70 on the exterior of the die holder.

The swivel connection 71 between the head 10 and the body 11 is constructed in a novel manner to provide free rotation while preventing axial movement of the head relative to the body thereby permitting the telescoping surfaces of these parts to be formed easily as smooth cylinders and enabling the desired clamping pressure to be achieved by substantially the same number of pumping strokes of the lever 34 in all angular positions of the head relative to the body. This connection 71, which sustains all of the axial clamping forces transmitted between the head and body, comprises a split ring contracted around the body and having axially facing surfaces abutting against opposed walls of registering grooves 72 and 73 formed in the telescoping parts of the head and the body to receive the ring. To permit removal of the head from the body, the groove 73 in the latter is made at least as deep as the radial thickness of the ring so that the ring 71, when contracted, is completely within the periphery of the body. A spreading screw 74 is threaded through the head and enters between the circumferentially facing ends of the ring to expand the latter into the head groove 72, this groove having a depth less than the radial thickness of the ring so that the ring, when expanded, overlaps the sides of both grooves. To insure contraction of the ring into the body groove 73 when the spreading screw 74 is retracted, registering radial holes 75 and 76 are formed in the ring and the head (Fig. 7) to receive the pivoted legs of a suitable plier-type ring contracting tool (not shown).

The dies 12 and 13 are seated in recesses 77 and 78 formed in and opening toward each other from the head 10 and the die holder 14 and complementary in shape to the outer surfaces of the dies. To provide a large backing area and permit their formation in simple turning operations, the dies are shaped generally as half cylinders, webs 79 projecting radially and inwardly from their inner peripheries. The axes of the recesses and the dies extend transversely of the axis of the ram 15 and the body 11 and the dies are retained in the recesses against movement outwardly along this axis by flanges 80 projecting toward each other from opposite edges of each recess and fitting over shoulders 81 spaced rearwardly from the flat sides of the dies to enable the latter to close and completely encircle the splicing sleeve 21 during a clamping operation.

Releasable locks 82 and 83 retain the dies 12 and 13 against endwise movement out of the recesses 77 and 78, the lock 83 on the die holder 14 comprising a spring urged ball carried by the die holder and movable radially into a circumferential groove 84 on the movable die. To permit replacement of the movable die 13 while the head 10 is assembled on the body 11, the head preferably is recessed as indicated at 92 (Fig. 1) in alinement with the die when the latter is in its retracted position. The lock 82 for holding the fixed die 12 in the head 10 comprises a pin yieldably urged radially of the head recess 77 and into a similar groove 85 in the fixed die. The outer end of the pin is flat and the groove is of rectangular cross section so that the fixed die is held positively in the head. This lock is released by inward shifting of a slide 86 (Fig. 1) having a cam surface 87 thereon engageable with a follower shoulder 88 on the pin 82 to retract the latter. To render the dies interchangeable and simplify formation of the grooves 84 and 85, the latter preferably are of the same cross section and extend completely around the peripheries of the dies. Thus, they may be formed by turning operations at the same time the peripheries of the dies are cut.

By duplicating the dies 12 and 13 and shaping the same as described above, the die peripheries, the grooves 84 and 85 therein, and the interior recesses 89 on one side of the webs 79 may be formed in simple turning operations performed on a bar. Then, after the dies have been separated from the bar by cutting the latter along an axial plane, recesses 90 on the other sides of the webs are formed by a turning operation and the dies are separated by cutting along a radial plane. Finally, a recess 91 in the web and cuts for the shoulders 81 may be made with a single milling cutter acting on a plurality of dies arranged side by side with their axes alined.

In the operation of the novel press described above, let it be assumed that the parts have been assembled and that a splicing sleeve 21 is positioned in the fixed die 12 as shown in Fig. 5 with the movable die 13, the reservoir piston 42, and the pressure release bar 53 on the lever 34 all in their retracted or inactive positions. To perform a clamping operation, the movable die is advanced rapidly toward the fixed die and against the splicing sleeve by turning the body handle 37 into the cap 44. Then, the ram 15 and the movable die 13 thereon are advanced farther at a slow rate and clamping pressure is applied by swinging the handles 36 and 37 toward and away from each other to actuate the pump 24, the trigger 60 being released so that the exhaust valve 39 is closed. During such swinging of the handles, inward movement of the lever 34 is limited by engagement of a stop 93 thereon with the exterior of the body as shown in Fig. 1. As soon as the dies are closed under the predetermined clamping pressure, the overload valve 37a opens thereby reducing the pressure in the ram cylinder 16 and indicating to the operator that the clamping operation has been completed.

Usually, the press is shifted axially along the sleeve 21 to clamp the latter at several axially spaced points, the movable die 13 being retracted to the position determined by the reservoir piston 42 and the lock 82 retaining the fixed die 12 positively in the head recess 77 during such shifting. To retract the ram 15 and the movable die 13 to the position determined by the reservoir piston 42, the operator first swings the handles 36 and 37 apart. Then, while both hands of the operator remain in the same position on the handles, the operator moves his index finger on the lever handle 36 to the trigger 60 and pulls the latter downwardly to raise the bar 53 into alinement with the exhaust valve actuator pin 52. Then, with the bar 53 still held in its active position, the handles are closed and the bar pushes the actuator pin inwardly to unseat the movable ball element 40 of the exhaust valve 39 far enough to open the latter as shown in Fig. 5. The handles are held in this partially closed position until the ram has retracted under the action of its return spring 17. Then, the trigger 60 is released for movement of the bar 53 to its inactive position under the action of its spring 63, the press then being in condition for another clamping operation. It will be seen that this connection 51 between the lever and the exhaust valve not only simplifies the operation of the press but contributes to the safety thereof.

To retract the movable die 13 completely, the reservoir piston 42 is retracted and the exhaust valve 39 is opened in the manner described above. The press then may be removed from the cable 22 by shifting the same axially beyond the sleeve 21 and then radially so that the cable which is of smaller diameter passes between the dies and through the open part of the C-shaped head 10.

Should the operator desire to swing the handles 36 and 37 back and forth in a plane parallel to the splicing sleeve 21 instead of in a plane normal thereto as shown in the drawings, he simply rotates the handles and the body 11 in either direction relative to the head 10 about the axis of the ram cylinder 16 as permitted by the connection 71. During such rotation, the head and the body remain in the same axial positions relative to each other so that, in the next clamping operation, the movable die 13 travels through the same distance and the desired clamping pressure is produced by the same number of pumping strokes of the lever 34 as is required when the handles are positioned to swing in a plane normal to the splicing sleeve. Although the die holder 14 and the movable die 13 also rotate with the head, the ram 15 remains in the same angular position relative to the body 11 as permitted by the rotary mounting of the die holder on the ram, thereby reducing wear on the wall of the ram cylinder 16 and the seal ring 25.

I claim as my invention:

1. In a portable metal working tool, the combination of, a body having a cylindrical end portion and a ram reciprocable therein, a die carried by the outer end of said ram and reciprocable therewith, a head telescoping with said body end portion and carrying a second die, selectively operable means on said body for advancing said ram and said first die thereon axially toward said second die to clamp work between the dies, and an axial pressure sustaining connection between the telescoping parts of said head and said body permitting free rotation of the two in opposite directions relative to each other while preventing relative axial displacement, said connection comprising axially facing annular shoulders on said head and said body defining opposite sides of annular grooves opening inwardly toward and registering with each other, a split ring seated in said grooves and having flat axially facing surfaces abutting said shoulders, the groove on said body having a depth radially at least as large as the radial thickness of said ring to permit contraction of the latter within the periphery of the body, and a spreader member carried by said head and movable between the circumferentially facing ends of said ring to expand the latter radially beyond the periphery of said body and radially into said groove in the head.

2. In a portable metal working tool, the combination of, a body having a cylinder, a head carried by said body and providing a member spaced axially from said cylinder, a ram member reciprocable in said cylinder toward and away from said head member, one of said members having a generally semi-cylindrical recess opening toward the other member with its axis extending transversely of the cylinder axis and defined in part by flanges extending longitudinally of the recess axis and inwardly toward each other from the outer edges of the recess, a die of generally semi-cylindrical shape complimentary to the shape of said recess, said die fitting into said recess and having exterior shoulders facing circumferentially and outwardly therefrom and spaced inwardly from the flat side of the die to seat behind said flanges and hold the die against movement outwardly from the recess along said cylinder axis, opposed surfaces spaced apart on the outer arcuate side of said die and facing longitudinally of the die axis, a locking element mounted on said one member to move into and out of said recess and having oppositely facing surface portions facing longitudinally of said recess axis and engaging said die surfaces to lock said die positively against shifting along said recess axis, and yieldable means on said one member acting between the latter and said locking element to urge the element into said recess, said locking element having a release surface engageable by a releasing member for shifting the element out of said recess.

3. In a portable metal working tool, the combination of, a body having a cylinder, a head carried by said body and providing a member spaced axially from said cylinder, a ram member reciprocable in said cylinder toward and away from said head member, one of said members having a semi-cylindrical recess opening toward the other member with its axis extending transversely of the cylinder axis and defined in part by flanges extending longitudinally of the recess axis and inwardly toward each other from the outer edges of the recess, a die of semi-cylindrical shape complementary to the shape of said recess, said die fitting into said recess and having exterior shoulders facing circumferentially and outwardly therefrom and spaced inwardly from the flat side of the die to seat behind said flanges and hold the die against movement outwardly from the recess along said cylinder axis, means on said die defining a groove of rectangular cross section opening radially and outwardly from and extending circumferentially around the outer arcuate side of said die, a locking element adapted to fit into said groove and hold said die positively against movement longitudinally of said recess axis and mounted on said one member for movement transversely of and into and out of the groove, yieldable means urging said locking element into said groove, and a release element mounted on said one member for movement back and forth and having a cam surface engageable with said locking element to retract the same out of said groove.

4. In a portable metal working tool, the combination of, two die supporting members, means mounting said members for relative movement toward and away from each other, one of said members having a die receiving recess opening toward the other member and in the direction of relative movement of the members and defined in part by flanges extending transversely of such direction and toward each other from opposite edge portions of the recess, a replaceable die of a shape complementary to that of said recess seated in the latter behind said flanges and having a recess on one side opening toward said other member and adapted to receive a splicing sleeve, said die having a groove of rectangular cross section on its other side opening toward said one member, a locking element adapted to fit into said groove and hold said die positively against movement transversely of said direction of member movement and mounted on said one member for movement transversely of and into and out of the groove, yieldable means urging said locking element into said groove, and a release element mounted on said one member for movement back and forth and having a cam surface engageable with said locking element to retract the same out of said groove.

5. For use with a portable metal working tool having a body including a cylinder, a head member carried by said body and having a portion spaced axially from said cylinder, a ram member reciprocable in said cylinder toward and away from said head portion, one of said members having a generally semi-cylindrical recess opening toward the other member with its axis extending transversely of the cylinder axis and defined in part by flanges extending longitudinally of the recess axis and inwardly toward each other from the outer edges of the recess, and a locking element mounted on said one member to move into and out of said recess and having spaced surface portions facing in opposite directions longitudinally of said recess axis, the improvement comprising a die having a generally semi-cylindrical shape complementary to the shape of said recess and adapted to fit into the recess, said die having exterior axially extending shoulders facing circumferentially and outwardly from the die and spaced inwardly from the circumferentially facing ends of the die to seat behind said flanges and hold the die against movement along said cylinder axis, said die also having opposed axially facing and generally parallel surfaces on the outer arcuate side of the die defining a groove opening radially from and extending in a circumferential direction around the die to receive said locking element with said spaced surface portions thereof engaging the opposed surfaces on the die to lock the latter positively against shifting out of the recess along the recess axis.

References Cited in the file of this patent
UNITED STATES PATENTS

| | | |
|---|---|---|
| 2,158,855 | Eby et al. | May 16, 1939 |
| 2,329,385 | Bratz | Sept. 14, 1943 |
| 2,424,849 | Rogoff et al. | July 29, 1947 |
| 2,555,421 | Ronan | June 5, 1951 |
| 2,600,860 | Dupre | June 17, 1952 |
| 2,688,231 | Northcutt | Sept. 7, 1954 |
| 2,696,850 | Peterson | Dec. 14, 1954 |
| 2,722,859 | Stoltz | Nov. 8, 1955 |